United States Patent [19]

Laue

[11] Patent Number: 4,689,605

[45] Date of Patent: Aug. 25, 1987

[54] POWERING DEVICE FOR TRANSMITTERS AND RECEIVERS OF A SIGNAL TRANSMISSION SYSTEM

[75] Inventor: Hans-Bodo Laue, Altenbeken, Fed. Rep. of Germany

[73] Assignee: Nixdorf Computer AG, Paderborn, Fed. Rep. of Germany

[21] Appl. No.: 765,289

[22] Filed: Aug. 13, 1985

[30] Foreign Application Priority Data

Aug. 17, 1984 [DE] Fed. Rep. of Germany ....... 3430337

[51] Int. Cl.$^4$ ..................... G08B 1/00; H04M 11/04
[52] U.S. Cl. .................... 340/333; 340/318; 340/310 R; 340/310 A; 340/538; 363/15; 363/19
[58] Field of Search ................. 340/333, 318, 310 R, 340/310 A, 538; 363/15–19; 323/902

[56] References Cited

U.S. PATENT DOCUMENTS

| 2,913,711 | 11/1959 | Polyzou et al. | 340/310 A |
| 4,004,110 | 1/1977 | Whyte | 340/310 R |
| 4,097,692 | 6/1978 | Felix | 340/310 R |
| 4,130,861 | 12/1978 | LaForest | 340/310 R |
| 4,344,066 | 8/1982 | Beggs | 340/310 A |
| 4,435,764 | 3/1984 | El-Gohary | |
| 4,475,209 | 10/1984 | Udren | 340/310 R |

FOREIGN PATENT DOCUMENTS 2062998 5/1981 United Kingdom .

Primary Examiner—Donnie L. Crosland
Attorney, Agent, or Firm—Cullen, Sloman, Cantor, Grauer, Scott & Rutherford

[57] ABSTRACT

In a signal transmission system whose transmission line (16) is connected to a line side component (66, 68) of a respective transmitter (12) and receiver (14) and is electrically isolated from the operating side, the line side component (66, 68) of the respective transmitter (12) and receiver (14) is powered from the operating side over through an isolating DC/DC-transducer (10).

10 Claims, 4 Drawing Figures

POWERING DEVICE FOR TRANSMITTERS AND RECEIVERS OF A SIGNAL TRANSMISSION SYSTEM

TECHNICAL FIELD

The invention relates to a device for providing power to a signal transmission system's transmitters and receivers. The system's transmission line is connected to a line side component of the respective transmitter and receiver and is electrically isolated from an operating side.

BACKGROUND ART

In most customary signal transmission systems, the line side component (connected to the transmission line) of both transmitter and receiver is electrically isolated from the operating side where a data signl for transmission either is present or will be received. Thus, the data transmission is guaranteed a high level of protection from interference. Consequently, the line side component of the transmitter and receiver of both transmitting and receiving stations must be supplied with voltage which is lso electrically isolated from the operating side.

It is customary to feed the operating side of the transmitter and receiver of both transmitting and receiving station with a supply voltage from the operating side and to feed the line side component of both transmitter and receiver via supply voltage lines that accompany the transmission line. The major disadvantage is that the supply voltage lines must be laid along the entire transmission route; consequently, installation costs increase significantly. A further disadvantage of this method of supplying power is that it is difficult to keep the supply voltage at least approximately constant along the entire transmission route.

SUMMARY OF THE INVENTION

The invention provides a more simple and economical technique of supplying voltage to the line side component of both transmitting and receiving stations.

This problem is solved in accordance with the present invention by feeding the line side component of both transmitter and receiver from the operating side via an electrically isolated DC/DCtransducer.

In contrast to the previously known manner of feeding the line side component, no additional supply voltage lines have to be provided when the present invention is employed, thus resulting in substantial cost savings.

If a DC/DC-transducer is used with a transducer transformer in which an alternating current is generated in its primary circuit from a direct current supply voltage present on the operating side by means of an oscillator circuit, (which is rectified on the secondary side of the transducer transformer) then the primary side alternating current is generated advantageously through an RC coupled drive of an inverting integrator. The RC coupled drive of the inverting integrator's output is shifted 180° out of phase by means of an inverting amplifier. The output of the inverting integrator also affects the input of the inverting amplifier, which inverts the inverting integrator's output signal. The inverting amplifier's output is for its part connected to the inverting integrator's input via an RC coupling. Whereas the inverting integrator maintins its directional integration during the time intervals in which its input voltage has a different polarity from its output voltage, the inverting integrator changes its directional integration in those time perids in which its input and output voltages have the same polarity. Consequently, the polarity of its output voltage changes. Thus, a stationary, self-sustaining alternating voltage is produced at the output of the inverting integrator.

In a different version of the DC/DC-transducer, the inverting integrator's output and the inverting amplifier's output are connected via the primary winding of the transducer transformer and a capacitor. Since the alternating output voltage of the inverting amplifier is 180° out of phase with respect to the alternating output voltage of the inverting integrator, the alternating voltage present on the primary winding of the transducer transformer is symmetrically grounded. Its amplitude corresponds to the sum of the absolute values of the output voltages of the inverting integrator and inverting amplifier. For example, if the inverting amplifier has an amplification factor of $-1$, then the alternating voltage on the primary winding of the transducer transformer has double the amplitude of the alternating inverting integrator's output voltage. By doubling the amplitude, the oscillator circuit's power output is quadrupled.

In a preferred embodiment, both the inverting integrator and the inverting amplifier are realized by means of a reversecoupled operational amplifier circuit. This allows for simple, cheap and space efficient construction of the switching configuration to generate the primary side alternating voltage.

It has also proven to be advantageous to have two series connected, opposed Zener-diodes in parallel to the capacitor in the feedback circuit of the operational amplifier configured as an inverting integrator. The amplitude of the alternating output voltage of the inverting integrator is limited for both polarities through these diodes. This primary side limit of alternating voltage amplitude equals the primary side alternating voltage stabilization. It has been shown that secondary stabilization circuits are no longer required due to this primary side alternating voltage stabilization. Since in the type of system considered here, the transmitter as well as the receiver must be fed with both a positive and negative voltage, four stabilization networks can be eliminated on each transmitting and receiving station. The signal form and the symmetric operation of the primary side alternating voltage has the further advantage that the DC/DC-transducer generates the smallest possible fraction of unwanted signals.

It has proven to be advantageous to connect the inverting amplifier to an external terminal. The external terminal is preferably connected to the inverting amplifier via an input circuit resistor. The advantage of such an external terminal is that a definite fraction of the alternating voltage, on the primary winding of the transducer transformer, can be measured against the operating side ground. Furthermore, an external alternating voltage can be coupled at low impedance via this external terminal to test the voltage tolerance of transmitting and receiving networks which are driven on the secondary side of the transducer. Due to the circuit construction of the DC/DCtransducer, this external alternating voltage records the self-generated output voltage to power transmitter and receiver with tolerance values required by the voltage tolerance test.

It has further proven to be desirable to feed both transmitter and receiver over a separate secondary winding of the transducer transformer, since, the transmitter and receiver are thus supplied with voltage independently of each other so that possible disturbances of the voltage supply, for example, of the transmitter, do not affect the receiver's voltage supply. Furthermore, it is possible, with this type of voltage supply, to make a different line side supply voltage available for the transmitter than for the receiver by different choices in the transfer relationship in the secondary winding.

The secondary side alternating voltages are preferably rectified by means of grounded, base transistors and filtered by means of filter capacitors. Through the use of transistors as rectifiers, a further voltage stabilization is achieved in addition to the primary side alternating voltage stabilization, since a lower impedance and more stable temperature rectification is possible with transistors in comparison to diodes. Thus, smaller variations in the voltage drop on the rectifier are produced under variations in the load.

DESCRIPTION OF THE PREFERRED EMBODIMENT

Figure 1:
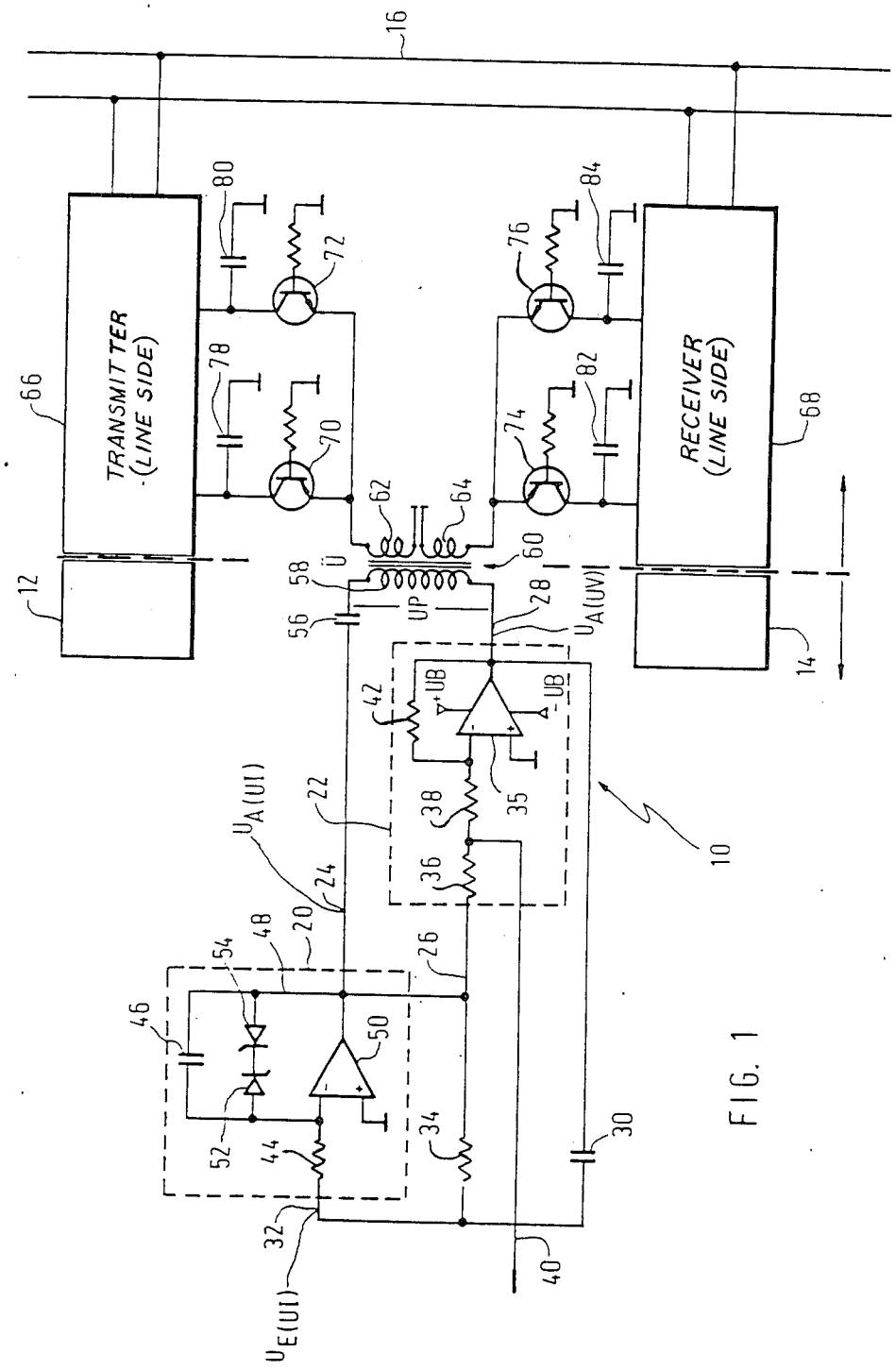
FIG. 1 is a detailed schematic diagram of a circuit of an electrically isolated DC/DC-transducer for a signal transmission system's transmitter and receiver.

In FIG. 1, the operating side of a DC/DC-transducer 10, a transmitter 12, and a receiver 14 are shown to the left of the vertical broken line. Similarly, to the right of the vertical broken line, the line side of the DC/DC-transducer 10, the transmitter 12, and the receiver 14, are all electrically isolated from the operating side, are shown. Transmitter 12 as well as receiver 14 are connected to a transmission line 16 of a signal transmission system. The operating side of the DC/DC-transducer 10 represents an oscillator circuit. It is essentially composed of an inverting integrator 20 and inverting amplifier 22. The output 24 of the inverting integrator 20 is connected to the input 26 of the inverting integrator 22. Output 28 of the inverting amplifier 22 is connected to the input 32 of the inverting integrator 20 through a capacitor 30. The input 32 of the inverting integrator 20 is further connected to the output 24 of the inverting integrator 20 via a resistor 34, and is thus connected with the input 26 of the inverting amplifier 22. The input circuit resistance of the operational amplifier 36, which is configured as an inverting amplifier, consists of two resistors 36 and 38 wired in series. An external terminal 40 is indicated at the junction of the two resistors 36 and 38.

The inverting amplifier 22 is realized with a reverse coupled operational amplifier circuit having amplification factor −1, so that the feedback resistor 42 has the same resistance as the series circuit of the resistors 36 and 38. Similar to the inverting amplifier 22, the inverting integrator 20 is also realized with a reverse coupled operational amplifier circuit. Input circuit resistor 44 and the condenser 46 in the feedback loop of the operational amplifier 50 together determine the integration constant and thus the steepness of the slope of the alternating voltage to be produced. In addition, a component consisting of two opposed Zener-diodes combined in series, is included in feedback loop 48 which is connected in parallel to capacitor 46. These diodes limit the alternating voltage's amplitude to be produced so that an amplitude-stabilized, trapezoidal signal form is produced.

Output 24 of the inverting integrator 20 is connected to one pole of the primary winding of the transducer transformer 60 via capacitor 56. The second pole of this winding is connected to output 28 of inverting amplifier 22. Capacitor 56 serves to affect a moderate direct current decoupling output 24 of inverting integrator 20 from output 28 of inverting amplifier 22. Thus, an equalizing curren between outputs 24 and 28 in case of symmetry errors of operational amplifiers 35 and 50, is avoided. Isolation of the operating side, from the line side, is accomplished via transducer transformer 60. It has two separate secondary windings 62 and 64, whereby the line side component 66 of transmitter 12 is fed via the first secondary winding 62 and the line side component 68 of the receiver 14 is fed via the second secondary winding 64 of the transducer transformer 60. The secondary alternating voltages are finally rectified by transistors 70, 72, 74, and 76 in a grounded-base circuit and are filtered by mens of filter capacitors 78, 80, 82, and 84.

Figure 2:
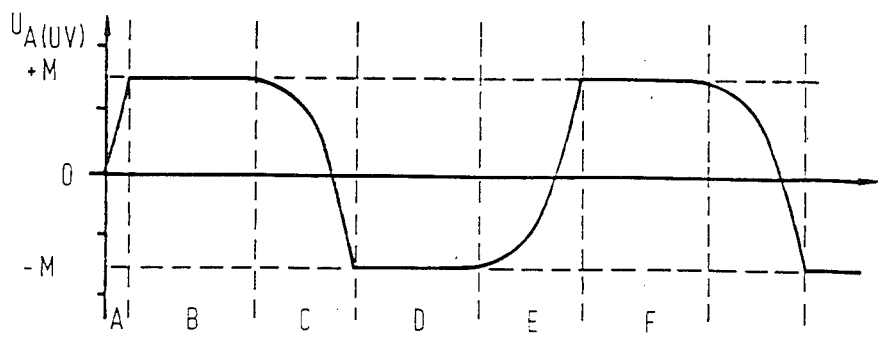
FIG. 2 is a waveform plot of the signal status $U_{A(UV)}$ at output 28 of the inverting amplifier 22 of FIG. 1.
Figure 3:
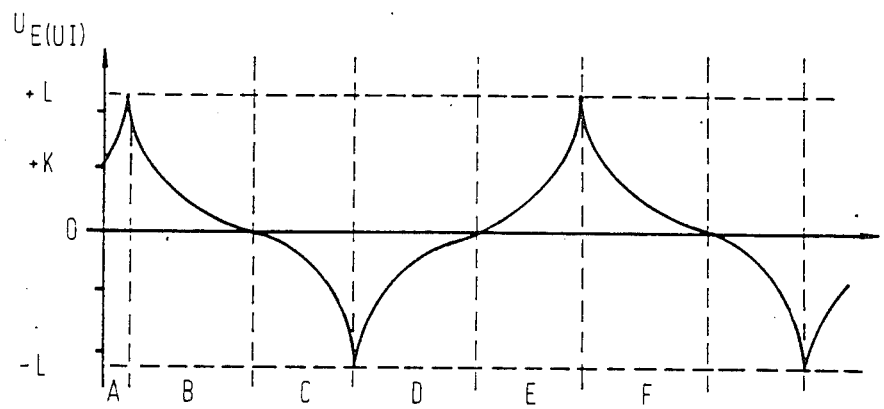
FIG. 3 is a waveform plot of the voltage status $U_{E(UI)}$ at input 32 of the reversing integrators 20 of FIG. 1; and, FIG. 4 is a waveform plot of the voltage status $U_{A(UI)}$ at the output of inverting integrator 20.
Figure 4:
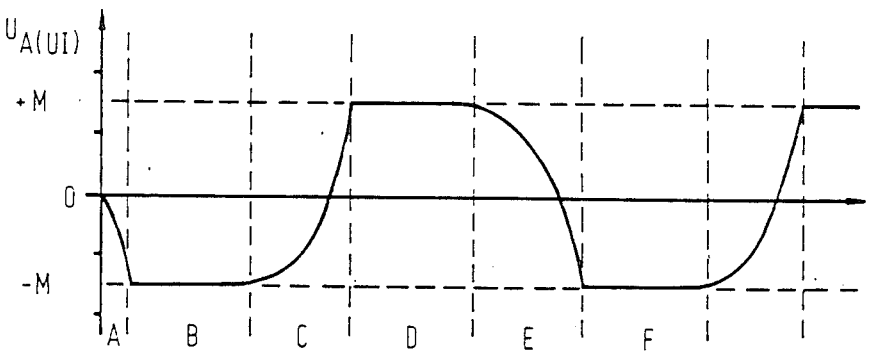

The following describes the method of operation of the operating side oscillator circuit of the DC/DC-transducer 10 for the stationary operating condition shown in FIGS. 1–4. FIG. 2 shows the voltage $U_{A(UV)}$ at output 28 of inverting amplifer 22; FIG. 3 shows the voltage $U_{E(UI)}$ at input 32 of the inverting integrator 20 and FIG. 4 shows voltage $U_{A(UI)}$ at the output 24 of inverting integrator 20.

Assuming that a trapezoidal alternating voltage $U_{A(UI)}$ is already present at output 24 of the inverting integrator 20, this trapezoidal alternating voltage $U_{A(UI)}$ is inverted by inverting amplifier 22, so that the trapezoidal output alternating voltage, $U_{A(UV)}$, is 180° out of phase compared to the trapezoidal output voltage $U_{A(UI)}$ of inverting integrator 20.

To generate or, alternately, to maintain the trapezoidal alternating voltage $U_{A(UI)}$ at output 24 of inverting integrator 20, its input 32 is driven by the trapezoidal alternating voltage $U_{A(UV)}$ present on output 28 of inverting amplifier 22 over the RC coupling consisting of capacitor 30 and resistor 44. This represents an RC high-pass relative to input 32 of the inverting integrator 20. Consequently, in the time interval A, in which theoutput voltage $U_{A(UV)}$ of inverting amplifier 22 jumps, for example, an increase with a sufficiently large slope (output situation), the charge on capacitor 30 remains nearly unchanged.

The input voltage $U_{E(UI)}$ of inverting integrator 20 increases accordingly by approximately the same amount as output voltage $U_{A(UV)}$ of inverting amplifier 22. Since the input voltage $U_{E(UI)}$ of inverting integrator 20 already has a positive output value +K before the negative voltage jump ($U_{A(UI)}$, interval A) at output 24 of inverting integrator 20, and, thus, also a positive output value +K before the positive voltage jump ($U_{A(UV)}$, interval A) at output 28 of inverting amplifer 22 for conduction of the negative voltage jump ($U_{A(UI)}$, interval A) at output 24 of inverting integrator 20, it takes on a value +L at output 28 of inverting amplifier 22 at the end of the positive voltage jump ($U_{A(UV)}$, interval A). This value corresponds closely to the sum of the output value $+K$ and the amplitude $+M$ of the positive voltage jump ($U_{A(UV)}$, interval A).

Since the input voltage $U_{E(UI)}$ of invreting integrator 20 does not change its polarity with the negative voltage jump ($U_{A(UI)}$, interval A) at its output 24, inverting integrator 20 at first maintains its direction of integration. Its negative output voltage $U_{A(UI)}$, however, is limited by the Zener-diode 54 to its breakdown voltage so that it takes on a constant negative value $-M$, until (interval B), inverting integrator 20 changes its direction of integration due to the polarity reversal of its input voltage $U_{E(UI)}$, (transition from interval B to interval C). Since inverting amplifier 22 only inverts output voltage $U_{A(UI)}$ of inverting integrator 20, a constant positive voltage $+M$ is present on its output 28 for this time period, (interval B).

During time interval B, in which both output voltage $U_{A(UI)}$ of inverting integrator 20 as well as output voltage $U_{A(UV)}$ of the inverting amplifier 22 are constant, capacitor 30 is discharged over resistor 34. Consequently, the initially positive input voltage $U_{E(UI)}$ of inverting integrator 20 becomes negative, whereby it changes its direction of integration. The change in the direction of integration in turn has the effect that the output voltage $U_{A(UI)}$ of inverting integrator 20, changes its polarity with a jump, (interval C), so that a constant voltage $+M$, (interval D) is produced; which is bounded by the second Zener-diode 52. Thus, the output voltage $U_{A(UV)}$ of inverting amplifier 22 also changes its polarity with a jump in the time interval C; it takes on a constant negative value $-M$ (interval D). In the time interval C in which the output voltage $U_{A(UV)}$ of inverting amplifier 22 makes the jump from the constant positive voltage $+M$ to the constant negative voltage $-M$, the charge on the capacitor 30 remains unchanged, so that the input voltage $U_{E(UI)}$ of inverting integrator 20 makes almost the same jump. Thus, it assumes its maximum negative value $-L$ at the end of the voltage jump at the transition from interval C to interval D.

During time interval D, following the voltage jump, in which the output voltage $U_{A(UV)}$ of inverting amplifer 22 has a constant negative value $-M$ and the output voltage $U_{A(UI)}$ of the inverting integrator 20 has a constant positive value $+M$, the capacitor 30 is again discharged over resistor 34. Thus the initially negative input voltage $U_{E(UI)}$ of the inverting integrator 20 becomes positive, whereby its direction of integration changes. The change in the direction of integration in turn, has the effect that the output voltage $U_{A(UI)}$ of the inverting integrator 20, changes its polarity in time interval E, so that it jumps from its constant positive value $+M$ to the constant negative value, $-M$, which is bounded by the Zener-diode 54. Since the inverting amplifier 22 only inverts to output voltage $U_{A(UI)}$ of the inverting integrator 20, the output voltage $U_{A(UV)}$ of the inverting amplifier 22, jumps simultaneously to the corresponding constant positive value $+M$, which corresponds to the initial situation. Thus, the above-described cycle which maintains the trapezoidal alternating voltage $U_{A(UI)}$ on the output 24 of the inverting integrator 20 begins anew.

The steepness of the sides of the trapezoidal alternating voltage $U_{A(UI)}$ is determined by the corresponding values of the resistor 44 and the capacitor 46. The two opposed Zener-diodes 52 and 54 which are wired in series in the feed back loop 48 of the inverting integrator 20, limit the alternating voltage $U_{A(UI)}$ for both polarities and in this way affect an amplitude stabilization.

Since the output alternating voltage $U_{A(UI)}$ of the inverting integrator 20 is 180° out of phase relative to the output alternating voltage $U_{A(UV)}$ of the inverting amplifier 22, the alternating voltage which lies on the primary winding 58 of the transducer transformer 60 has an amplitude which corresponds to the sum of the absolute values of the output voltages of the inverting integrator 20 and the inverting amplifier 22.

What is claimed is:

1. An improved devise for powering a transmitter and a receiver of a signal transmission system having a transmission line, the transmitter and receiver each having a line side portion and an operating side portion electrically isolated from the line side portion, and wherein the transmission line is connected to the line side portion of the transmitter and the receiver, the improvement comprising:

an electrically isolated DC/DC transducer for simultaneously powering the line side portion of the transmitter and the line side portion of the receiver, said transducer having primary circuit means for producing an alternating voltage from an applied, operating side, DC power source, secondary circuit means for producing at least one DC voltage for powering the line side portions of the transmitter and receiver, and a transformer having a primary winding connected to the primary circuit means and at least one secondary winding connected to said secondary circuit means, wherein the transformer electrically isolates said primary and secondary circuit means from one another.

2. The device recited in claim 1, wherein said primary circuit means includes an oscillator circuit having an inverting integrator and inverting amplifier.

3. The device recited in claim 2, wherein said primary circuit means further includes a resistor and a capacitor operatively arranged with respect to the integrator to provide a timing function that regulates the frequency of the alternating voltage, and wherein the integrator and inverting amplifier are operatively connected to one another such that voltage waveforms produced by the integrator and amplifier are substantially 180° out of phase.

4. The device as recited in claim 3 wherein the outputs of the integrator and the amplifier are electrically coupled to and arranged for providing a voltage for powering opposite sides of the primary winding.

5. The device recited in claim 4 wherein the primary circuit means further includes a condenser operatively disposed between one of the outputs and the primary winding.

6. The device recited in claim 2, 3 or 5 wherein the primary circuit means further includes a plurality of reverse coupled operational amplifier circuits, and wherein the integrator and amplifier each form part of one of the operational amplifier circuits.

7. The device recited in claim 6 wherein the primary circuit means further includes a pair of opposed Zener-diodes arranged in series and a feedback circuit associated with the operational amplifier circuit which includes the inverting integrator, the feedback circuit including the capacitor and the series pair of Zener-diodes electrically connected in parallel with one another.

8. The device recited in claim 2, 4 or 5, further including an external terminal and a second resistor, wherein the terminal is connected to the inverting amplifier through the resistor.

9. The device recited in claim 2 or 4 wherein the transformer includes a plurality of separate secondary windings for individually powering the line side portions of the transmitter and receiver, and the secondary circuit means is arranged for producing a plurality of electrically distinct DC voltages includes a plurality of rectifying circuits each being electrically connected between one of the secondary windings and one of the line side portions of the transmitter and receiver.

10. A device recited in claim 9 wherein each of the rectifying circuits includes a plurality of transistors, each transistor being operatively arranged in a grounded-base circuit configuration for rectifying signals from its respective secondary winding and a plurality of capacitors for filtering the rectified signals.

* * * * *